(12) United States Patent
Schmidt et al.

(10) Patent No.: US 11,673,805 B2
(45) Date of Patent: Jun. 13, 2023

(54) PROCESS AND PLANT FOR PREPARATION OF HYDROGEN AND SEPARATION OF CARBON DIOXIDE

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Teja Schmid McGuinness, Frankfurt am Main (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1 day.

(21) Appl. No.: 17/399,277

(22) Filed: Aug. 11, 2021

(65) Prior Publication Data

US 2022/0048768 A1 Feb. 17, 2022

(30) Foreign Application Priority Data

Aug. 11, 2020 (EP) .................................... 20020366

(51) Int. Cl.
*C01B 3/40* (2006.01)
*B01D 53/047* (2006.01)
*C01B 3/48* (2006.01)

(52) U.S. Cl.
CPC .............. *C01B 3/40* (2013.01); *B01D 53/047* (2013.01); *C01B 3/48* (2013.01);
(Continued)

(58) Field of Classification Search
CPC ..... C01B 3/40; C01B 3/48; C01B 2203/0233; C01B 2203/0244; C01B 2203/0405;
(Continued)

(56) References Cited

U.S. PATENT DOCUMENTS

2015/0141535 A1* 5/2015 Kresnyak ................. C10K 1/32
208/97
2015/0321914 A1* 11/2015 Darde ....................... C01B 5/00
422/162

OTHER PUBLICATIONS

Aasberg-Petersen, K. et al., Natural gas to synthesis gas—catalysts and catalytic processes, Journal of Natural Gas Science and Engineering, Elsevier, Amsterdam, NL, vol. 3, No. 2, Mar. 28, 2011.
(Continued)

*Primary Examiner* — Steven J Bos
*Assistant Examiner* — Syed T Iqbal
(74) *Attorney, Agent, or Firm* — Elwood L. Haynes (57) ABSTRACT

The invention relates to a process for preparing hydrogen by reforming hydrocarbons with steam, and for separation of carbon dioxide. The process includes one endothermic and one autothermal reforming step for production of a synthesis gas stream, wherein heat generated in the autothermal reforming step is utilized for heating in the endothermic reforming step. The process also includes a step of converting the synthesis gas stream obtained for enrichment with hydrogen, a step of separating the hydrogen thus prepared by pressure swing adsorption, and a step of separation of carbon dioxide from the residual gas obtained in the pressure swing adsorption. The reforming units for the endothermal and autothermal reforming steps are arranged parallel to one another or in series.

12 Claims, 3 Drawing Sheets

(52) U.S. Cl.
CPC ............. *C01B 2203/0233* (2013.01); *C01B 2203/0244* (2013.01); *C01B 2203/042* (2013.01); *C01B 2203/0405* (2013.01); *C01B 2203/046* (2013.01); *C01B 2203/1058* (2013.01); *C01B 2203/1241* (2013.01)

(58) Field of Classification Search
CPC ........ C01B 2203/042; C01B 2203/046; C01B 2203/1058; C01B 2203/1241; C01B 32/50; C01B 2203/0283; C01B 2203/043; C01B 2203/0475; C01B 2203/147; C01B 3/56; C01B 3/38; C01B 3/503; C01B 3/506; C01B 2203/0261; C01B 2203/0811; C01B 2203/1235; C01B 3/382; C01B 2203/0833; C01B 2203/0838; B01D 53/047; B01D 53/002; B01D 53/22; B01D 2256/16; B01D 2257/504; Y02C 20/40; Y02P 20/151; F25J 3/067; F25J 3/08
See application file for complete search history.

(56) References Cited

OTHER PUBLICATIONS

Wismann, S.T. et al. Electrified methane reforming: a compact approach to greener industrial hydrogen production, Science 364, 2019, 756-759.
European Search Report for corresponding EP 20020366, dated Jan. 18, 2021.

* cited by examiner

PROCESS AND PLANT FOR PREPARATION OF HYDROGEN AND SEPARATION OF CARBON DIOXIDE

CROSS REFERENCE TO RELATED APPLICATIONS

This application claims priority to EP 20020366, filed Aug. 11, 2020, the entire contents of which are incorporated herein by reference.

BACKGROUND

Field of the Invention

The invention relates to a process for preparing hydrogen by reforming hydrocarbons with steam, and for separation of carbon dioxide. The invention further relates to a plant for preparation of hydrogen by reforming hydrocarbons with steam, and for separation of carbon dioxide.

Prior Art

A current estimate of the volume of hydrogen produced globally is 70 Mt/a, with the greatest proportion thereof produced by endothermic reforming of natural gas with steam over a nickel-based reforming catalyst. In this process, referred to as steam methane reforming (SMR), there is reaction mainly of methane and steam to give a mixture of mainly hydrogen, carbon monoxide and carbon dioxide. The steam reforming process has a large carbon dioxide footprint since about 9 tonnes of carbon dioxide are emitted for every tonne of hydrogen produced. According to calculations, steam reforming of natural gas alone contributes to global carbon dioxide emissions with a share of 1.5% (Wismann et al., Science 364, 756-759, 2019).

Hydrogen is also produced by autothermal reforming (ATR) of natural gas. Autothermal reforming differs from steam reforming in that the endothermic reforming step is preceded by an exothermic partial oxidation step that provides the heat of reaction needed for the downstream endothermic catalytic step. In general, air or oxygen, for example, from an air fractionation plant, is used as oxidation medium for the partial oxidation. Moreover, ATR requires a burner which, with the aid of a fuel gas, provides the activation energy required for the partial oxidation. The result of these two reaction steps, the partial oxidation of methane and the subsequent endothermic catalytic reforming of the intermediate with steam, is likewise a synthesis gas comprising mainly hydrogen, carbon monoxide and carbon dioxide.

In order to make the processes mentioned more environmentally friendly, there has previously been development of processes in order to separate the carbon dioxide produced in SMR or ATR as a carbon dioxide product of maximum purity from the synthesis gas mixture produced as the primary product. For this purpose, gas scrubbing processes based on physical or chemical absorption in absorbents such as methanol or amines are available, as is cryogenic liquid separation and purification of the carbon dioxide by compression, condensation and distillation. However, the carbon dioxide which is absorbed in absorbents in large volumes and then desorbed again or separated out by condensation at low temperatures frequently cannot be sent to any viable further industrial use. Therefore, the only option that remains is frequently to store the unusable carbon dioxide over a long period of time in order not to allow it to get into the atmosphere. The combination of separation (by gas scrubbing or condensation) and storage of carbon dioxide is also referred to as sequestration or CCS (carbon capture and storage).

It is therefore necessary to improve known processes for producing hydrogen in such a way that smaller amounts of carbon dioxide per tonne of hydrogen produced are generated from the outset.

US 2015/0321914 A1 discloses a process in which a synthesis gas produced as the primary product by steam reforming or autothermal reforming is converted to carbon dioxide and hydrogen by conversion of the carbon monoxide present in the synthesis gas produced as the primary product with steam (water-gas shift reaction). Subsequently, hydrogen is separated from the carbon dioxide- and hydrogen-enriched converted synthesis gas with the aid of a pressure swing adsorption unit. The residual gas which is depleted of hydrogen but still rich in carbon dioxide is subsequently treated in an apparatus referred to as cryogenic purification unit (CPU), in order to separate carbon dioxide out of the residual gas and liquefy it in a form of maximum purity. The liquefied carbon dioxide can subsequently be sent to storage or used for industrial or consumable purposes.

SUMMARY

It is a general object of the present invention to overcome the abovementioned disadvantages of the prior art.

More particularly, it is an object of the present invention to modify known processes so as to reduce the amount of carbon dioxide formed per unit weight of hydrogen produced.

More particularly, it is an object of the present invention to reduce carbon dioxide emissions from processes that combine autothermal reforming of methane with cryogenic carbon dioxide separation.

A contribution to the at least partial achievement of at least one of the above objects is made by the independent claims. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The objects of the invention are at least partly achieved by a process for preparing hydrogen by reforming hydrocarbons with steam, and for separation of carbon dioxide, wherein the process comprises the following steps:
(a) providing a feed gas stream FG, wherein the feed gas stream FG comprises a hydrocarbon component and steam, wherein the hydrocarbon component comprises at least methane;
(b) reforming at least a portion of the feed gas stream FG in an endothermic reforming step over a reforming catalyst to give a synthesis gas stream SG1, wherein the synthesis gas stream SG1 comprises hydrogen, carbon monoxide, carbon dioxide, and unreacted methane;
(c) reforming a portion of the feed gas stream FG in an autothermal reforming step to give a synthesis gas stream SG2, and combining the synthesis gas streams SG1 and SG2 to give a synthesis gas stream SG3, or reforming the synthesis gas stream SG1 in an autothermal reforming step to give a synthesis gas stream SG3,
wherein the autothermal reforming step comprises exothermic partial oxidation and endothermic reforming with steam over a reforming catalyst, wherein
the synthesis gas streams SG2 and SG3 comprise hydrogen, carbon monoxide, carbon dioxide, and unreacted methane, and wherein
heat generated by the autothermal reforming step is utilized for heating in the endothermic reforming step of step (b);
(d) converting the carbon monoxide present in the synthesis gas stream SG3 with steam to give hydrogen and carbon dioxide to give a synthesis gas stream SG4, wherein the synthesis gas stream SG4 comprises hydrogen, carbon dioxide, unreacted methane, and carbon monoxide unconverted in step (d);
(e) separating hydrogen from the synthesis gas stream SG4 by pressure swing adsorption, giving a hydrogen-rich stream HG1 and a residual gas stream RG1, wherein the residual gas stream RG1 comprises carbon dioxide, carbon monoxide unconverted in step (d), hydrogen not separated off in step (e), and unreacted methane;
(e) separating carbon dioxide from the residual gas stream RG1 obtained in step (e) by cryogenic carbon dioxide separation, giving a carbon dioxide-rich stream CG1 and a residual gas stream RG2, wherein the residual gas stream RG2 comprises carbon monoxide unconverted in step (d), hydrogen not separated off in step (e), carbon dioxide not separated off in step (f), and unreacted methane.

Compared to processes known from the prior art, it is a feature of the process according to the invention that a combination of endothermic and autothermal reforming steps is used in steps (b) and (c), and heat generated by the autothermal reforming step is utilized for heating in the endothermic reforming step of step (b). The autothermal reforming step is performed in an autothermal reforming unit (autothermal reformer). The endothermic reforming step is performed in an endothermic reforming unit (endothermic reformer, for example steam reformer). This surprisingly significantly lowers the specific carbon dioxide emissions with regard to the overall process. "Specific carbon dioxide emissions" is understood to mean the mass of $CO_2$ formed throughout the process per standard cubic metre of hydrogen produced. The specific carbon dioxide emissions can be reported, for example, in kg $CO_2/m^3$ (STP).

In the endothermic reforming step of step (b), the feed gas FG is converted to the synthesis gas SG1 over a suitable catalyst by supply of heat. The catalyst is, for example, a nickel catalyst known to the person skilled in the art. The heat required for the reforming reaction to proceed for the endothermic reforming step is provided at least partly, preferably completely, by heat formed in the autothermal reforming step. According to the arrangement of the reforming units, the feed gas SG is introduced partly or fully into the reforming unit of the endothermic reforming step and converted to the synthesis gas SG1.

The autothermal reforming step in step (c) comprises a step of partial oxidation of the feed gas stream FG and a subsequent endothermic reforming step with steam for conversion of the feed gas FG to the synthesis gas stream SG2 or to the synthesis gas stream SG3. The step of partial oxidation in the autothermal reforming step entails the supply of an oxidizing agent such as air, pure oxygen, or oxygen-enriched air. The oxidizing agent is typically introduced into the autothermal reformer via a burner. The partial oxidation of the feed gas stream FG to the synthesis gas stream SG2 or to the synthesis gas stream SG3 in the course of the autothermal reforming step is an exothermic reaction. The waste heat generated as a result is utilized for the "endothermic portion" of the autothermal reforming step. The autothermal reforming step is designed such that sufficient heat is generated in total, over two reaction stages (partial oxidation and endothermic reforming), which is utilizable for heating of the endothermic reforming step for conversion of the feed gas FG to the synthesis gas SG1.

The process according to the invention includes two alternatives defined by step (c).

In the first alternative, a portion of the feed gas stream FG is reformed in the endothermic reforming step to give the synthesis gas stream SG1. A further portion of the feed gas stream FG, preferably the remaining portion of the feed gas stream FG, is reformed in the autothermal reforming step to give the synthesis gas stream SG2.

The synthesis gas streams SG2 and SG3 are then combined to give a synthesis gas stream SG3. This results in a parallel arrangement or connection of the reforming units for the endothermic reforming step and for the autothermal reforming step.

In the second alternative of the process according to the invention, the feed gas SG is introduced fully into the reforming unit of the endothermic reforming step and converted to the synthesis gas stream SG1. This converts the feed gas FG only partly to the synthesis gas SG1, meaning that there remains a comparatively high proportion of methane and possibly other reformable hydrocarbon components in the synthesis gas SG1. This remaining amount is subsequently reformed in the autothermal reforming step to give the synthesis gas SG3. This results in a series arrangement or connection of the reforming units for the endothermic reforming step and for the autothermal reforming step, with the autothermal reforming step following on from the endothermic reforming step. In other words, the reforming unit for the autothermal reforming step is arranged downstream of the reforming unit for the endothermic reforming step in gas flow direction.

Preferably, the synthesis gas stream produced in the autothermal reforming step, i.e. synthesis gas stream SG2 in the case of parallel arrangement of the reforming units or synthesis gas stream SG3 in the case of series arrangement of the reforming units, is utilized directly for the transfer of heat in the endothermic reforming step. The synthesis gas stream SG2 and/or the synthesis gas stream SG3 here preferably have a temperature of 750 to 1100° C.

The feed gas stream FG includes at least one hydrocarbon component which is reformable with steam to give a synthesis gas SG1, SG2, SG3 or SG4. The synthesis gas includes at least hydrogen, carbon monoxide and carbon dioxide as product components. The feed gas stream FG includes at least methane as hydrocarbon component. Further higher analogous hydrocarbons, for example ethane, propane or butane, may be present in the feed gas stream FG.

A feed gas may first be treated in what is called a preliminary reformer in order to convert higher hydrocarbons with steam to short-chain hydrocarbons, especially with the purpose of increasing the methane content in the feed gas stream FG. The purpose of the preliminary reformer is thus generally to convert hydrocarbons having at least two carbon atoms to carbon monoxide, hydrogen and methane.

A feed gas stream FG treated in a preliminary reformer may thus already contain certain amounts of carbon monoxide and hydrogen.

The synthesis gas stream SG3 formed by the combination of autothermal and endothermic reforming steps is sent to a conversion step (d). In this conversion step, carbon monoxide present in the synthesis gas stream SG3 is reacted with water by what is called the water-gas shift reaction over a suitable catalyst to give hydrogen and carbon dioxide. Prior to introduction into step (d), the synthesis gas SG3 is cooled. Depending on whether step (d) is what is called a low-temperature shift or a high-temperature shift, the synthesis gas SG3 is cooled to a greater or lesser degree prior to introduction into step (d).

The synthesis gas stream SG4 formed by the conversion step (d) is enriched with hydrogen and carbon dioxide, and depleted of carbon monoxide. Synthesis gas stream SG4 is subsequently subjected to a separation step (e) in which substantially pure hydrogen is produced from the synthesis gas stream SG4 by pressure swing adsorption (PSA). The hydrogen-rich stream HG1 obtained by the pressure swing adsorption regularly has a hydrogen content of at least 95 mol %, preferably of at least 99 mol %, further preferably of at least 99.5 mol % and further preferably of at least 99.9 mol %. The hydrogen-depleted by-product of the pressure swing adsorption step, the residual gas stream RG1, is greatly depleted of hydrogen and greatly enriched with carbon dioxide compared to the synthesis gas stream SG4. It also comprises carbon monoxide unconverted in step (d), and methane unconverted in steps (b) and (c). As a result of the presence of gases having high calorific value (methane, carbon monoxide and hydrogen), it can be used as fuel within or outside the process.

For separation of carbon dioxide from the residual gas stream RG1, it is sent to a cryogenic carbon dioxide separation in step (f), which affords a carbon dioxide-rich stream CG1 and a further residual gas stream RG2. The separation step (f) requires the partial condensation of the carbon dioxide present in the residual gas stream RG1, and, for achievement of a particular purity, subsequently and optionally the distillation of the carbon dioxide-rich stream CG1. The cryogenic carbon dioxide separation is preferably performed at a temperature of less than 35° C., or less than 20° C., or less than 0° C., or less than −20° C., or less than −40° C., or less than −50° C., or less than −55° C. The cryogenic carbon dioxide separation is also preferably performed at a temperature of more than −60° C.

The synthesis gas stream SG1 can also be referred to as the first synthesis gas stream, the synthesis gas stream SG2 as the second synthesis gas stream, and so forth. This is also applicable mutatis mutandis to all other fluid streams RG, CG and HG numbered in the context of this disclosure.

A preferred embodiment of the process according to the invention is characterized in that hydrogen is separated from the residual gas stream RG2, giving a hydrogen-rich stream HG2 and a residual gas stream RG3. The residual gas stream RG2, in spite of the preceding separation step by pressure swing adsorption, regularly includes relatively large amounts of residual hydrogen of up to 50 mol %. It is therefore advantageous to feed the residual gas stream 2 to a further separation step for separation or at least enrichment of hydrogen. Preference is given to separating the hydrogen from the residual gas stream RG2 by membrane separation.

In one example of the process according to the invention, the hydrogen-rich stream HG2 is supplied to the synthesis gas stream SG4 for separation of hydrogen by pressure swing adsorption in step (e). Membrane separation processes in particular do not have sufficient selectivity to obtain a hydrogen stream having high purity, for example of more than 99 mol %, from the residual gas stream RG2. Since a second pressure swing adsorption step in the sense of a second pressure swing adsorption apparatus would be too complex and costly, the hydrogen-rich stream HG2 is advantageously sent to step (e), which increases the hydrogen yield based on the overall process.

Alternatively, gases present in the hydrogen-rich stream HG2 are utilized as fuel gases for heating in the autothermal reforming step of step c). For the autothermal reforming step, the feed gas FG has to be warmed, which can be effected, for example, by means of a fired heating unit. The fired heating unit may be heated at least partly with the aid of the gases present in the hydrogen-rich stream HG2 that have a high calorific value, especially carbon monoxide, methane and hydrogen, in order to improve the thermal integration of the process.

A preferred embodiment of the process according to the invention is characterized in that the carbon dioxide-rich stream CG1 comprises unreacted methane, and the carbon dioxide-rich stream CG1 is subjected to a thermal separation process for separation of methane, giving a carbon dioxide-rich stream CG2. The carbon dioxide-rich stream may, as a result of the cryogenic carbon dioxide separation, contain significant amounts of methane, for example up to 0.2 mol % of methane, or up to 0.5 mol % of methane. A further step including a thermal separation process can further increase the carbon dioxide content of the carbon dioxide-rich stream CG1. The thermal separation process is preferably a distillation. This can give a largely pure carbon dioxide product that can more easily be sent to an environmentally viable valorization than a methane-contaminated carbon dioxide product. For example, pure carbon dioxide can be mixed with electrolysis hydrogen in the correct ratio as synthesis gas for methanol production. In the sequestration of the carbon dioxide too, a pure carbon dioxide product has advantages since especially methane-contaminated carbon dioxide, in the event of unintended release after sequestration, would enhance the greenhouse effect in a known manner.

A preferred embodiment of the process according to the invention is characterized in that carbon dioxide is separated from the residual gas stream RG3, giving a carbon dioxide-rich stream CG3 and a residual gas stream RG4. The carbon dioxide is preferably separated by membrane separation from the residual gas stream RG3, in order to obtain the carbon dioxide-rich stream CG3 and the residual gas stream RG4.

In one example of the process according to the invention, gases present in the residual gas stream RG4 are utilized as fuel gases for heating in the autothermal reforming step of step c).

The carbon dioxide-rich stream CG3 is preferably supplied to the residual gas stream RG1 for cryogenic carbon dioxide separation in step (f). This increases the yield of utilizable carbon dioxide and reduces the amount of carbon dioxide actually emitted to a minimum.

A preferred embodiment of the process according to the invention is characterized in that the residual gas stream RG1, for cryogenic carbon dioxide separation in step (f), is subjected to at least one compression step and at least one cooling step, giving the carbon dioxide-rich stream CG1 at least partly in the form of a condensed carbon dioxide stream. The cryogenic carbon dioxide separation is preferably conducted under pressure by compression, for example a pressure between 5 and 74 bar, with simultaneous cooling of residual gas stream RG1, preferably to a temperature above the triple point of carbon dioxide (minus 56° C.) or another temperature suitable for the condensation. Under these temperature and pressure conditions, the carbon dioxide partly condenses out, enriching the liquid phase with carbon dioxide and enriching the gas phase with uncondensable gases. Preferably, and to the extent required, step (f) includes multiple compression steps and/or multiple cooling steps, meaning that the condensation of carbon dioxide out of the residual gas stream RG1 is effected in multiple successive compression and cooling steps.

Preferably, and to the extent required, the residual gas stream RG1 is dried in one or more steps in the course of step (f). A drying step can be performed before a compression step, between two compression steps and/or after a compression step. A drying step can also be performed before a cooling step, between two cooling steps and/or after a cooling step.

Preferably, and to the extent required, the residual gas stream RG1, in the course of step (f), is subjected to one or more separation steps for removal of condensable constituents such as methanol. A separation step can be performed before a compression step, between two compression steps and/or after a compression step. A separation step can also be performed before a cooling step, between two cooling steps and/or after a cooling step.

The objects of the invention are also at least partly achieved by a plant, wherein the plant is configured for performance of the process according to the invention.

The objects of the invention are also at least partly achieved by a plant for preparation of hydrogen by reforming hydrocarbons with steam, and for separation of carbon dioxide, wherein the plant comprises the following plant components in fluid connection with one another:

(a) means of providing a feed gas stream FG, wherein the feed gas stream FG comprises a hydrocarbon component and steam, wherein the hydrocarbon component comprises at least methane;

(b) a first reforming unit, wherein the first reforming unit is configured for reforming at least a portion of the feed gas stream FG in an endothermic reforming step over a reforming catalyst, wherein a synthesis gas stream SG1 is obtainable in the endothermic reforming step, wherein the synthesis gas stream SG1 comprises hydrogen, carbon monoxide, carbon dioxide, and unreacted methane;

(c) a second reforming unit, arranged parallel to or downstream of the first reforming unit, wherein the second reforming unit, in the case of parallel arrangement to the first reforming unit, is configured for reforming of a portion of the feed gas stream FG in an autothermal reforming step, wherein the autothermal reforming step comprises exothermic partial oxidation and endothermic reforming with steam over a reforming catalyst and a synthesis gas stream SG2 is obtainable in the autothermal reforming step, and the first and second reforming unit, in the case of parallel arrangement, are configured such that the synthesis gas streams SG1 and SG2 can be combined to give a synthesis gas stream SG3, the second reforming unit, in the case of arrangement downstream of the first reforming unit, is configured for reforming of at least a portion of the synthesis gas stream SG1 in an autothermal reforming step, wherein the autothermal reforming step comprises exothermic partial oxidation and endothermic reforming with steam over a reforming catalyst, wherein a synthesis gas stream SG3 is obtainable in the autothermal reforming step, wherein the synthesis gas streams SG2 and SG3 comprise hydrogen, carbon monoxide, carbon dioxide, and unreacted methane, and the first reforming unit (b) and the second reforming unit (c) are configured such that heat generated in the second reforming unit (c) by the autothermal reforming step is utilizable for heating in the first reforming unit (b);

(d) a converter unit, arranged downstream of the first and second reforming unit in the case of parallel arrangement of the first and second reforming unit, or arranged downstream of the second reforming unit in the case of arrangement of the second reforming unit downstream of the first reforming unit, wherein the converter unit is configured for conversion of the carbon monoxide present in the synthesis gas stream SG3 with steam to give carbon dioxide and hydrogen, giving a synthesis gas stream SG3, and the synthesis gas stream SG3 comprises hydrogen, carbon dioxide, unreacted methane, and carbon monoxide unconverted in the converter unit;

(e) a pressure swing adsorption unit, arranged downstream of the converter unit, wherein the pressure swing adsorption unit is configured to separate hydrogen from the synthesis gas stream SG3, wherein a hydrogen-rich stream HG1 and a residual gas stream RG1 are obtainable, wherein the residual gas stream RG1 comprises carbon dioxide, carbon monoxide unconverted in the converter unit, hydrogen not separated off in the pressure swing adsorption unit, and unreacted methane;

(f) a separation unit arranged downstream of the pressure swing adsorption unit, wherein the separation unit is configured for cryogenic separation of carbon dioxide from the residual gas stream RG1 produced in the pressure swing adsorption unit, wherein a carbon dioxide-rich stream CG1 and a residual gas stream RG2 are obtainable, wherein the residual gas stream RG2 comprises carbon monoxide unconverted in the converter unit, hydrogen not separated off in the pressure swing adsorption unit, carbon dioxide not separated off in the separation unit, and unreacted methane.

According to the invention, the first reforming unit (b) and the second reforming unit (c) are configured such that heat generated in the second reforming unit (c) by the autothermal reforming step is utilizable for heating in the first reforming unit (b). The first reforming unit is configured for an endothermic reforming step. The second reforming unit is configured for an autothermal reforming step. The second reforming unit is preferably an autothermal reformer. The second reforming unit is arranged parallel to the first reforming unit or downstream of the first reforming unit.

In the case of parallel arrangement to the first reforming unit, the second reforming unit produces a synthesis gas stream SG2 that can be combined with the synthesis gas stream SG1 from the first reforming unit. The synthesis gas stream SG2 is preferably utilized directly for heating in the first reforming unit, meaning that the heat present in the synthesis gas stream SG2 is utilized directly for heating in the first reforming unit. What is meant by "directly" in this connection is that the heat present in the synthesis gas stream SG2 is not transferred to a further heat transport medium. The heat present in the synthesis gas stream SG2 is accordingly utilized for production of the synthesis gas stream SG1 in the endothermic process in the first reforming unit.

In the case of arrangement downstream of the first reforming unit, the second reforming unit produces a synthesis gas stream SG3. The synthesis gas stream SG3 is preferably utilized directly for heating in the first reforming unit, meaning that the heat present in the synthesis gas stream SG3 is utilized directly for heating in the first reforming unit. What is meant by "directly" in this connection is that the heat present in the synthesis gas stream SG3 is not transferred to a further heat transport medium. The heat present in the synthesis gas stream SG3 is accordingly utilized for production of the synthesis gas stream SG1 in the endothermic process in the first reforming unit.

BRIEF DESCRIPTION OF THE DRAWINGS

The invention is elucidated in detail hereinafter by two inventive working examples and one noninventive comparative example in conjunction with three drawings, where the working examples and the drawings do not mean any restriction of the invention.

The figures show.

DETAILED DESCRIPTION OF PREFERRED EMBODIMENTS

Figure 1:
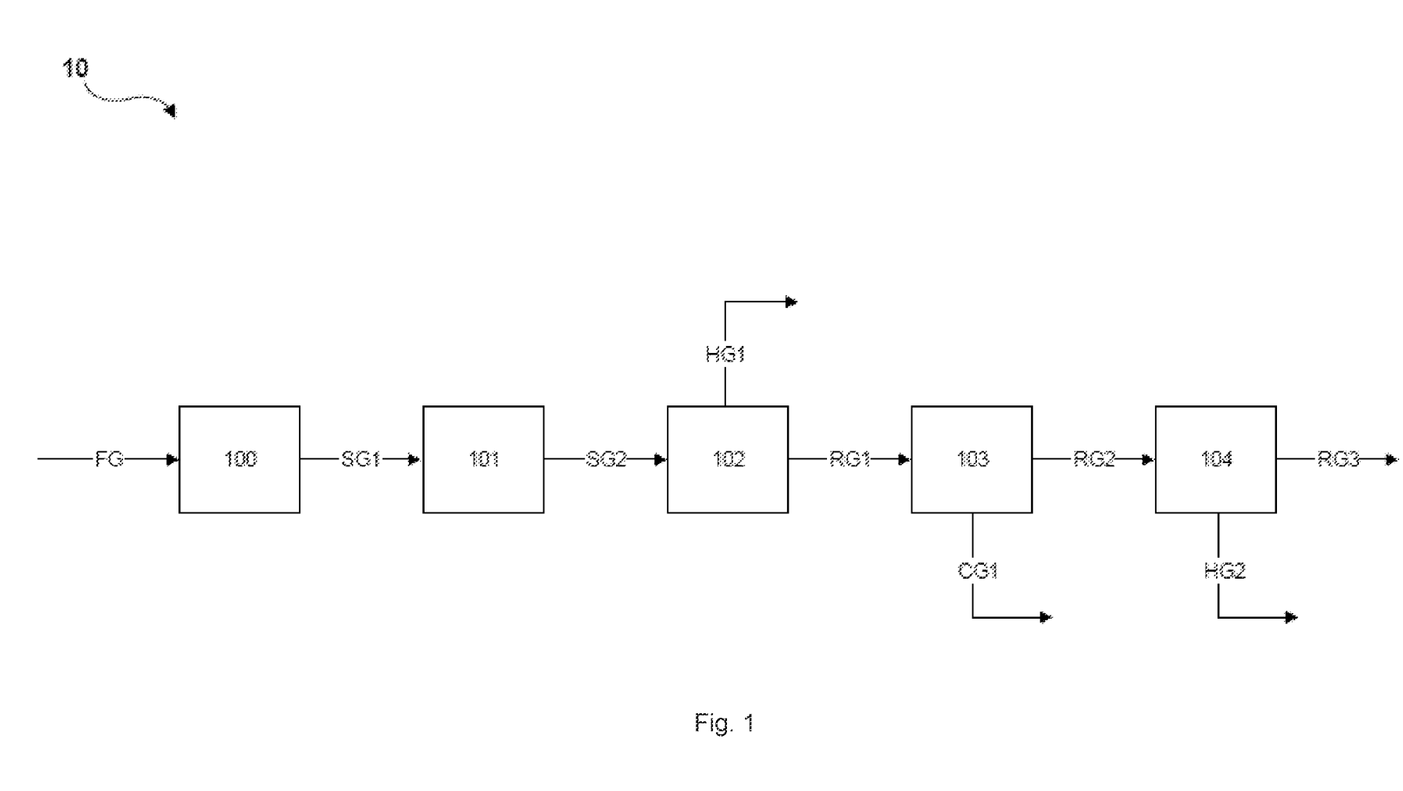
FIG. 1 is a block flow diagram of a process or plant according to the prior art.

FIG. 1 shows a highly simplified block flow diagram of a process or plant according to the prior art, as disclosed, for example, in US 2015/0321914. A feed gas stream FG is introduced into an autothermal reforming unit 100 and converted to a synthesis gas stream SG1. Synthesis gas stream SG1 is subsequently introduced into a converter unit 101, which results in reaction of carbon monoxide present in synthesis gas stream SG1 with steam to give carbon dioxide and hydrogen. Hydrogen-enriched synthesis gas stream SG2 is subsequently introduced into a pressure swing adsorption unit 102 in order to separate hydrogen from the synthesis gas stream SG2 with high purity. Hydrogen separated from the pressure swing adsorption unit 102 is discharged from the pressure swing adsorption unit 102 in the form of a hydrogen-rich stream HG1. A hydrogen-depleted residual gas stream RG1 is likewise drawn off from the pressure swing adsorption unit 102 and introduced into a separation unit 103. In the separation unit 103, carbon dioxide is separated out in high purity by means of multiple compression and cooling steps and drying steps, and drawn off from the separation unit in the form of a carbon dioxide-rich stream CG1. Carbon dioxide-rich stream CG1 still contains significant residual amounts of methane that can optionally be removed by distillation of the carbon dioxide-rich stream CG1 (not shown). The resulting pure carbon dioxide product is suitable for the sequestration of carbon dioxide or for further use, for example the synthesis of methanol by reaction with hydrogen produced from an electrolysis stream. A highly carbon dioxide-depleted residual gas stream RG2 is also drawn off from the separation unit 103 and introduced into a membrane unit 104. A hydrogen-rich stream HG2 which is enriched with hydrogen compared to residual gas stream RG2 is produced by membrane separation in membrane unit 104 and drawn off from the membrane unit 104. In addition, a residual gas stream RG3 depleted of hydrogen compared to residual gas stream RG2 is produced and drawn off from the membrane unit 104. Hydrogen-rich stream HG2, for further use, can optionally either be recycled to the pressure adsorption unit 102 to increase the hydrogen yield or can be used as fuel gas in the autothermal reforming unit 100.

Table 1 below shows a material balance of a simulation of a process according to FIG. 1. The simulation was conducted with the aid of the "Aspen Plus" software. The composition of the feed gas stream is reported without added steam.

TABLE 1

| Material balance in comparative example | | | | | | | | | | |
|---|---|---|---|---|---|---|---|---|---|---|
| | | FG | SG1 | SG2 | HG1 | RG1 | RG2 | CG1 | HG2 | RG3 |
| Temperature | ° C. | 40 | 975 | 40 | 40 | 40 | 40 | 40 | 40 | 40 |
| Pressure | bar | 51 | 47 | 43 | 43 | 2 | 20 | 30 | 30 | 3 |
| Molar flow rate | kmol/h | 3869 | 16768 | 14272 | 8923 | 5349 | 2570 | 2750 | 1841 | 729 |
| $CO_2$ | mol % | 0.77 | 6.46 | 24.57 | 0.00 | 65.57 | 29.69 | 99.77 | 33.77 | 19.39 |
| CO | mol % | 0.00 | 15.77 | 0.97 | 0.00 | 2.58 | 5.38 | 0.00 | 1.84 | 14.33 |
| $H_2$ | mol % | 0.00 | 46.88 | 71.04 | 99.99 | 22.75 | 47.35 | 0.00 | 61.96 | 10.44 |
| $N_2$ | mol % | 0.54 | 0.12 | 0.15 | 0.00 | 0.38 | 0.80 | 0.00 | 0.19 | 2.32 |
| $CH_4$ | mol % | 94.31 | 2.17 | 2.55 | 0.00 | 6.81 | 13.93 | 0.23 | 2.24 | 43.44 |
| $C_2H_6$ | mol % | 3.96 | 0.00 | 0.00 | 0.00 | 0.00 | 0.00 | 0.00 | 0.00 | 0.00 |
| $C_3H_8$ | mol % | 0.39 | 0.00 | 0.00 | 0.00 | 0.00 | 0.00 | 0.00 | 0.00 | 0.00 |
| $C_4H_{10}$ | mol % | 0.03 | 0.00 | 0.00 | 0.00 | 0.00 | 0.00 | 0.00 | 0.00 | 0.00 |
| $H_2O$ | mol % | 0.00 | 28.57 | 0.52 | 0.00 | 1.38 | 1.78 | 0.00 | 0.00 | 6.28 |
| Methanol | mol % | 0.00 | 0.00 | 0.17 | 0.00 | 0.46 | 0.92 | 0.00 | 0.00 | 3.24 |
| Ar | mol % | 0.00 | 0.02 | 0.03 | 0.00 | 0.08 | 0.16 | 0.00 | 0.00 | 0.55 |

The specific carbon dioxide emission of the process according to the process of FIG. 1 with the material balance according to table 1 is 0.140 kg of $CO_2$ per standard cubic metre ($m^3$(STP)) of hydrogen produced.

Rather than the autothermal reforming unit 100, it is also possible, as likewise disclosed in US 2015/0321914, to use an endothermic reforming unit. More particularly, the endothermic reforming unit may be a steam reformer known to the person skilled in the art. In the case of use of a steam reformer, the specific carbon dioxide emission, at 0.396 kg of $CO_2$ per standard cubic metre of hydrogen produced, is several times higher than in the case of use of an autothermal reformer.

Figure 2:
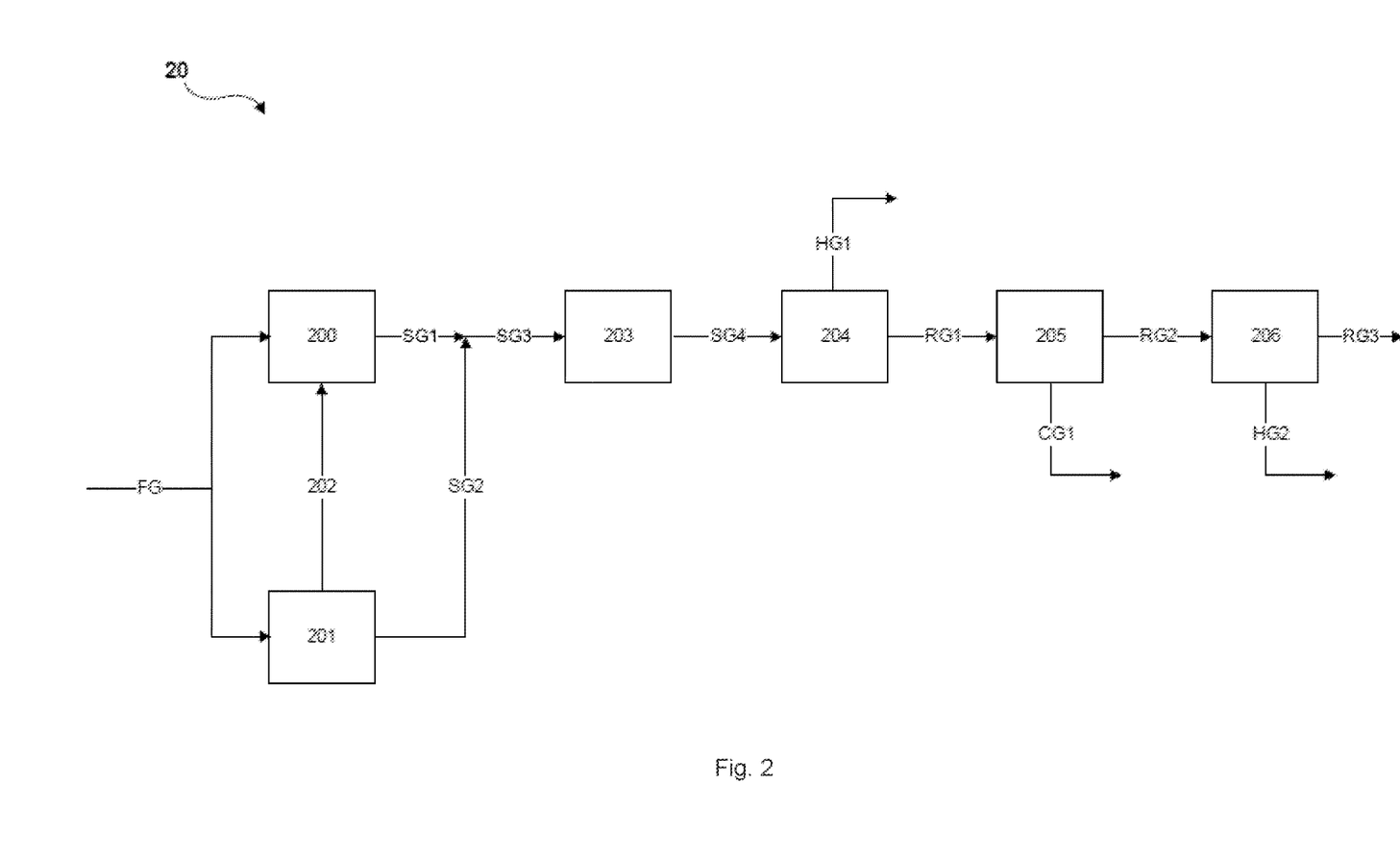
FIG. 2 is a block flow diagram of a first alternative of a process according to the invention or of a plant according to the invention with parallel arrangement of the reforming units for the endothermic and autothermal reforming steps.

FIG. 2 shows a highly simplified block flow diagram of a process or plant in a first example of the invention (Example 1) with a parallel arrangement of the reforming units. A feed gas stream FG is divided into two substreams. A first substream of the feed gas stream FG is introduced into an endothermic reforming unit 200 (first reforming unit, configured for an endothermic reforming step). A second substream of the feed gas stream FG is introduced into an autothermal reforming unit 201 (second reforming unit, configured for an autothermal reforming step). In the endothermic reforming unit 200, the first substream of the feed gas stream FG is converted to a synthesis gas stream SG1. In the autothermal reforming unit 201, the second substream of the feed gas stream FG is converted to a synthesis gas stream SG2. The heat generated in the autothermal reforming step of the autothermal reforming unit 201 is utilized for heating in the endothermic reforming step in the endothermic reforming unit 200, indicated by the heat flow 202. The second synthesis gas stream SG2 is preferably utilized directly for heating in the endothermic reforming step in the endothermic reforming unit 200, meaning that the heat present in the second synthesis gas stream SG2 is utilized without transfer to a further heat transport medium for heating in the endothermic reforming step in the endothermic reforming unit 201.

The synthesis gas streams SG1 and SG2 that are produced by the endothermic reforming unit 200 and the autothermal reforming unit 201 are combined to give a mixed synthesis gas stream SG3 which is introduced into a converter unit 203, as a result of which carbon monoxide present in the synthesis gas stream SG3 is reacted with steam to give carbon dioxide and hydrogen. Hydrogen-enriched synthesis gas stream SG4 is subsequently introduced into a pressure swing adsorption unit 204 in order to separate hydrogen from the synthesis gas stream SG4 with high purity. Hydrogen separated from the pressure swing adsorption unit 204 is discharged from the pressure swing adsorption unit 204 in the form of a hydrogen-rich stream HG1. A hydrogen-depleted first residual gas stream RG1 is likewise drawn off from the pressure swing adsorption unit 204 and introduced into a separation unit 205. In the separation unit 205, carbon dioxide is separated out in high purity by means of multiple compression and cooling steps and drying steps, and drawn off from the separation unit 205 in the form of a carbon dioxide-rich stream CG1. Carbon dioxide-rich stream CG1 still contains significant residual amounts of methane that can optionally be removed by distillation of the carbon dioxide-rich stream CG1 (not shown). The resulting pure carbon dioxide product is suitable for the sequestration of carbon dioxide or for further use, for example the synthesis of methanol by reaction with hydrogen produced from electrolysis.

A highly carbon dioxide-depleted residual gas stream RG2 is also drawn off from the separation unit 205 and introduced into a membrane unit 206. A hydrogen-rich stream HG2 which is enriched with hydrogen compared to the residual gas stream RG2 is produced by membrane separation in membrane unit 206 and drawn off from the membrane unit 206. In addition, a residual gas stream RG3 depleted of hydrogen compared to the residual gas stream RG2 is produced and drawn off from the membrane unit 206. The hydrogen-rich stream HG2, for further use, can optionally either be recycled to the pressure adsorption unit 204 to increase the overall hydrogen yield of the process or can be used as fuel gas in the autothermal reforming unit 201.

Table 2 below shows a material balance of a simulation of the first example of a process according to the invention as per FIG. 2. The simulation was conducted with the aid of the "Aspen Plus" software. The composition of the feed gas stream is reported without added steam.

TABLE 2

Material balance of Example 1

| | | FG | SG3 | SG4 | HG1 | RG1 | RG2 | CG1 | HG2 | RG3 |
|---|---|---|---|---|---|---|---|---|---|---|
| Temperature | ° C. | 40 | 958 | 40 | 40 | 40 | 40 | 40 | 40 | 40 |
| Pressure | bar | 51 | 47 | 42 | 41 | 2 | 20 | 20 | 40 | 5 |
| Molar flow rate | kmol/h | 3252 | 15139 | 12476 | 8923 | 5400 | 2671 | 2729 | 1847 | 824 |
| $CO_2$ | mol % | 0.77 | 6.07 | 22.93 | 0.00 | 64.40 | 28.32 | 99.71 | 33.36 | 17.01 |
| CO | mol % | 0.00 | 13.96 | 0.88 | 0.00 | 2.70 | 5.46 | 0.00 | 1.93 | 13.36 |
| $H_2$ | mol % | 0.00 | 47.34 | 72.13 | 99.99 | 22.53 | 45.54 | 0.00 | 61.74 | 9.24 |
| $N_2$ | mol % | 0.54 | 0.12 | 0.14 | 0.00 | 0.38 | 0.78 | 0.00 | 0.20 | 2.08 |
| $CH_4$ | mol % | 94.31 | 2.65 | 3.21 | 0.00 | 8.37 | 16.63 | 0.29 | 2.77 | 47.69 |
| $C_2H_6$ | mol % | 3.96 | 0.00 | 0.00 | 0.00 | 0.00 | 0.00 | 0.00 | 0.00 | 0.00 |
| $C_3H_8$ | mol % | 0.39 | 0.00 | 0.00 | 0.00 | 0.00 | 0.00 | 0.00 | 0.00 | 0.00 |
| $C_4H_{10}$ | mol % | 0.03 | 0.00 | 0.00 | 0.00 | 0.00 | 0.00 | 0.00 | 0.00 | 0.00 |
| $H_2O$ | mol % | 0.00 | 29.85 | 0.53 | 0.00 | 1.23 | 2.49 | 0.00 | 0.00 | 8.07 |
| Methanol | mol % | 0.00 | 0.00 | 0.15 | 0.00 | 0.34 | 0.69 | 0.00 | 0.00 | 2.25 |
| Ar | mol % | 0.00 | 0.02 | 0.02 | 0.00 | 0.05 | 0.10 | 0.00 | 0.00 | 0.31 |

The specific carbon dioxide emission of the process according to FIG. 2 with the material balance according to table 2 is 0.128 kg of $CO_2$ per standard cubic metre ($m^3$(STP)) of hydrogen produced. Compared to the comparative example, this corresponds to a reduction in specific carbon dioxide emissions of 9%.

Figure 3:
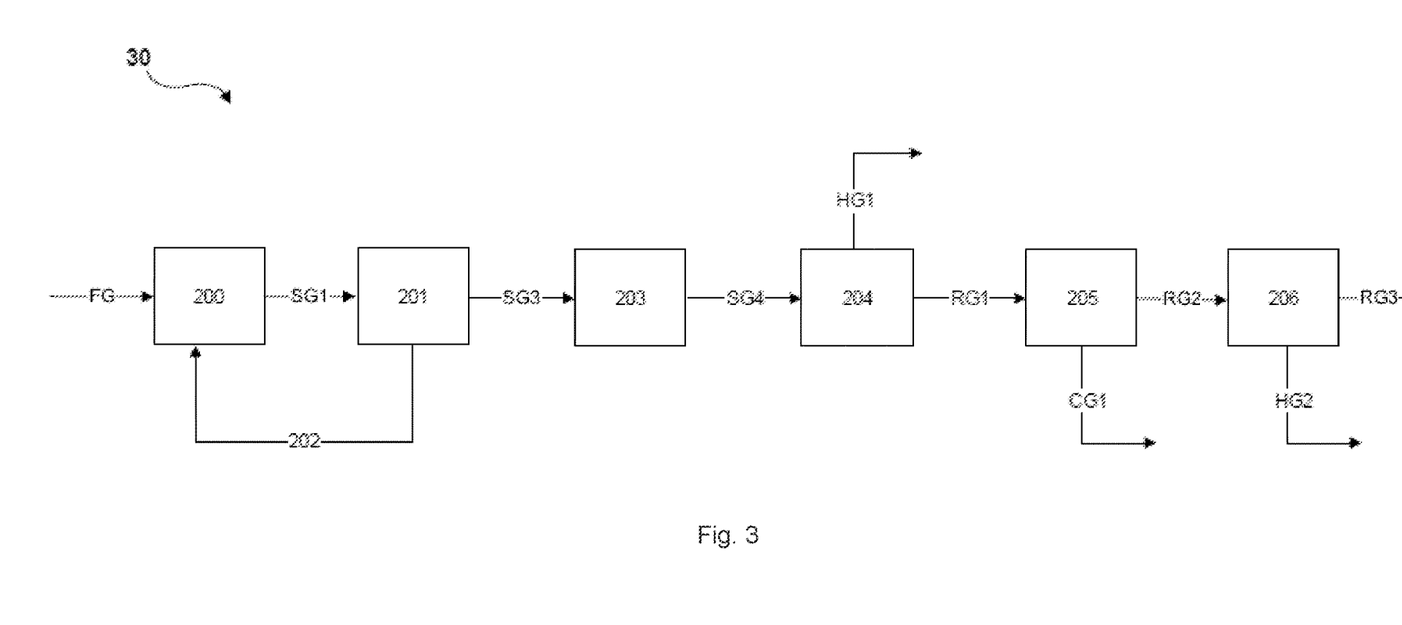
FIG. 3 is a block flow diagram of a second alternative of a process according to the invention or of a plant according to the invention with series arrangement of the reforming units for the endothermic and autothermal reforming steps.

FIG. 3 shows a highly simplified block flow diagram of a process or plant in a second example of the invention (Example 2). The process or plant according to FIG. 3 differs from the process or plant according to FIG. 2 by the series arrangement or connection of the reforming units. The endothermic reforming unit 200 (first reforming unit, configured for an endothermic reforming step) is arranged upstream of the autothermal reforming unit 201 (second reforming unit, configured for an autothermal reforming step) in gas flow direction, and the latter is correspondingly arranged downstream of the endothermic reforming unit 200 in gas flow direction. A feed gas stream FG is introduced into an endothermic reforming unit 200 and converted to a synthesis gas stream SG1. The synthesis gas stream SG1 is converted to a synthesis gas stream SG3 in the autothermal reforming unit 201. The heat generated in the autothermal reforming step of the autothermal reforming unit 201 is utilized for heating in the endothermic reforming step in the endothermic reforming unit 200, indicated by the heat flow 202. Synthesis gas stream SG3 is preferably utilized directly for heating in the endothermic reforming step in the endothermic reforming unit 200, meaning that the heat present in synthesis gas stream SG3 is utilized without further transfer to a heat transport medium for heating in the endothermic reforming step in the endothermic reforming unit 200. All the subsequent process steps correspond to Example 1 according to FIG. 2.

Table 3 below shows a material balance of a simulation of the second example of a process according to the invention as per FIG. 3. The simulation was conducted with the aid of the "Aspen Plus" software. The composition of the feed gas stream is reported without added steam.

HG1 hydrogen-rich stream
HG2 hydrogen-rich stream
CG1 carbon dioxide-rich stream
RG1 residual gas stream
RG2 residual gas stream
RG3 residual gas stream
100 autothermal reforming unit
101 converter unit
102 pressure swing adsorption unit
103 separation unit
104 membrane unit
200 endothermic reforming unit
201 autothermal reforming unit
202 heat flow
203 converter unit
204 pressure swing adsorption unit
205 separation unit
206 membrane unit It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

TABLE 3

Material balance of Example 2

|  |  | FG | SG3 | SG4 | HG1 | RG1 | RG2 | CG1 | HG2 | RG3 |
|---|---|---|---|---|---|---|---|---|---|---|
| Temperature | °C. | 40 | 975 | 40 | 40 | 40 | 40 | 40 | 40 | 40 |
| Pressure | bar | 51 | 44 | 39 | 39 | 2 | 20 | 20 | 40 | 5 |
| Molar flow rate | kmol/h | 2540 | 15037 | 11714 | 8923 | 4281 | 4281 | 2242 | 1491 | 549 |
| $CO_2$ | mol % | 0.77 | 5.02 | 20.09 | 0.00 | 66.80 | 66.80 | 99.82 | 34.01 | 21.01 |
| CO | mol % | 0.00 | 11.40 | 0.66 | 0.00 | 2.39 | 2.39 | 0.00 | 1.68 | 14.08 |
| $H_2$ | mol % | 0.00 | 49.59 | 76.71 | 100.0 | 23.16 | 23.16 | 0.00 | 62.35 | 11.31 |
| $N_2$ | mol % | 0.54 | 0.09 | 0.12 | 0.00 | 0.39 | 0.39 | 0.00 | 0.19 | 2.50 |
| $CH_4$ | mol % | 94.31 | 1.37 | 1.76 | 0.00 | 5.44 | 5.44 | 0.18 | 1.77 | 36.91 |
| $C_2H_6$ | mol % | 3.96 | 0.00 | 0.00 | 0.00 | 0.00 | 0.00 | 0.00 | 0.00 | 0.00 |
| $C_3H_8$ | mol % | 0.39 | 0.00 | 0.00 | 0.00 | 0.00 | 0.00 | 0.00 | 0.00 | 0.00 |
| $C_4H_{10}$ | mol % | 0.03 | 0.00 | 0.00 | 0.00 | 0.00 | 0.00 | 0.00 | 0.00 | 0.00 |
| $H_2O$ | mol % | 0.00 | 32.52 | 0.56 | 0.00 | 1.54 | 1.54 | 0.00 | 0.00 | 12.04 |
| Methanol | mol % | 0.00 | 0.00 | 0.10 | 0.00 | 0.27 | 0.27 | 0.00 | 0.00 | 2.08 |
| Ar | mol % | 0.00 | 0.00 | 0.00 | 0.00 | 0.01 | 0.01 | 0.00 | 0.00 | 0.09 |

The specific carbon dioxide emission of the process according to FIG. 3 with the material balance according to table 3 is 0.118 kg of $CO_2$ per standard cubic metre ($m^3$ (STP)) of hydrogen produced. Compared to the comparative example, this corresponds to a reduction in specific carbon dioxide emission of 15%. In addition, the series arrangement of the reforming units 200 and 201, with regard to the reduction in specific carbon dioxide emission, results in an advantage over the parallel arrangement of the reforming units 200 and 201 according to FIG. 2.

LIST OF REFERENCE SYMBOLS

FG feed gas stream
SG1 synthesis gas stream
SG2 synthesis gas stream
SG3 synthesis gas stream
SG4 synthesis gas stream

What is claimed is:

1. A process for preparing hydrogen by reforming hydrocarbons with steam, and for separation of carbon dioxide, comprising:
   (a) providing a feed gas stream, wherein the feed gas stream comprises a hydrocarbon component and steam, wherein the hydrocarbon component comprises at least methane;
   (b) reforming at least a portion of the feed gas stream in an endothermic reforming step over a reforming catalyst thereby producing a first synthesis gas stream, wherein the first synthesis gas stream comprises hydrogen, carbon monoxide, carbon dioxide, and unreacted methane;
   (c) reforming a portion of the feed gas stream in an autothermal reforming step thereby producing a second synthesis gas stream, and combining the first synthesis gas stream and the second synthesis gas stream thereby producing a third synthesis gas stream, or reforming the first synthesis gas stream in an autothermal reforming step thereby producing a third synthesis gas stream,
wherein the autothermal reforming step comprises exothermic partial oxidation and endothermic reforming with steam over a reforming catalyst,
wherein the second synthesis gas stream and the third synthesis gas stream comprise hydrogen, carbon monoxide, carbon dioxide, and unreacted methane, and
wherein heat generated by the autothermal reforming step is utilized for heating in the endothermic reforming step of step (b);
(d) converting the carbon monoxide present in the third synthesis gas stream with steam thereby producing hydrogen and carbon dioxide thereby producing a fourth synthesis gas stream, wherein the fourth synthesis gas stream comprises hydrogen, carbon dioxide, unreacted methane, and carbon monoxide unconverted in step (d);
(e) separating hydrogen from the fourth synthesis gas stream by pressure swing adsorption, thereby producing a first hydrogen-rich stream and a first residual gas stream, wherein the first residual gas stream comprises carbon dioxide, carbon monoxide unconverted in step (d), hydrogen not separated off in step (e), and unreacted methane;
(f) separating carbon dioxide from the first residual gas stream obtained in step (e) by cryogenic carbon dioxide separation, thereby producing a first carbon dioxide-rich stream and a second residual gas stream RG2, wherein the second residual gas stream comprises carbon monoxide unconverted in step (d), hydrogen not separated off in step (e), carbon dioxide not separated off in step (f), and unreacted methane.

2. The process according to claim 1, wherein hydrogen is separated from the second residual gas stream, thereby producing a second hydrogen-rich stream and a third residual gas stream.

3. The process according to claim 2, wherein the hydrogen is separated from the second residual gas stream by membrane separation.

4. The process according to claim 2, wherein the second hydrogen-rich stream is supplied to the fourth synthesis gas stream for separation of hydrogen by pressure swing adsorption in step (e).

5. The process according to claim 2, wherein gases present in the second hydrogen-rich stream are utilized as fuel gases for heating in the autothermal reforming step of step c).

6. The process according to claim 1, wherein the first carbon dioxide-rich stream comprises unreacted methane, and the first carbon dioxide-rich stream is subjected to a thermal separation process for separation of methane, thereby producing a second carbon dioxide-rich stream.

7. The process according to claim 2, wherein carbon dioxide is separated from the third residual gas stream, thereby producing a third carbon dioxide-rich stream and a fourth residual gas stream.

8. The process according to claim 7, wherein the carbon dioxide is separated from the third residual gas stream by membrane separation.

9. The process according to claim 7, wherein gases present in the fourth residual gas stream are utilized as fuel gases for heating in the autothermal reforming step of step c).

10. The process according to claim 7, wherein the third carbon dioxide-rich stream is supplied to the first residual gas stream for cryogenic carbon dioxide separation in step (f).

11. The process according to claim 1, wherein the first residual gas stream, for cryogenic carbon dioxide separation in step (f), is subjected to at least one compression step and at least one cooling step, thereby producing the first carbon dioxide-rich stream at least partly in the form of a condensed carbon dioxide stream.

12. A plant configured for performance of the process according to claim 1.

* * * * *